United States Patent [19]
Chisum

[11] Patent Number: 5,341,575
[45] Date of Patent: Aug. 30, 1994

[54] APPARATUS TO GATHER, DISPLAY, AND/OR PRINT VEHICLE CHASSIS MEASUREMENT DATA FOR ACCURATE REPAIR OF COLLISION DAMAGED VEHICLES

[76] Inventor: Finis L. Chisum, Rte. 5, Box 267, Claremore, Okla. 74017

[21] Appl. No.: 979,422

[22] Filed: Nov. 19, 1992

Related U.S. Application Data

[63] Continuation of Ser. No. 778,391, Oct. 16, 1991, abandoned, which is a continuation-in-part of Ser. No. 431,471, Nov. 1, 1989, Pat. No. 5,058,286.

[51] Int. Cl.$^5$ .......................... G01B 5/25; G01C 15/12
[52] U.S. Cl. .......................................... 33/608; 33/288
[58] Field of Search ...................... 33/608, 288, 23.03, 33/503, 504, 1 M; 72/705, 457, 447

[56] References Cited

U.S. PATENT DOCUMENTS

| | | |
|---|---|---|
| Re. 31,636 | 7/1984 | Chisum . |
| 3,032,881 | 5/1962 | Fengler ..................... 33/23.03 |
| 4,174,623 | 11/1979 | LeGrand et al. . |
| 4,242,803 | 1/1981 | Dory . |
| 4,319,402 | 3/1982 | Martin . |
| 4,321,754 | 3/1982 | Colby . |
| 4,329,784 | 5/1982 | Bjork . |
| 4,442,608 | 4/1984 | Clausen . |
| 4,463,937 | 8/1984 | Celette . |
| 4,490,918 | 1/1985 | Clausen . |
| 4,534,200 | 8/1985 | Celette . |
| 4,557,127 | 12/1985 | Pietrelli . |
| 4,574,614 | 3/1986 | Field . |
| 4,586,359 | 5/1986 | Parks . |
| 4,603,570 | 8/1986 | Dehn . |
| 4,621,430 | 11/1986 | Lenz ........................ 33/711 |
| 4,660,405 | 4/1987 | Widegren et al. . |
| 4,719,704 | 1/1988 | Hogg ........................ 33/608 |
| 4,731,936 | 3/1988 | Aldrich et al. . |
| 4,756,089 | 7/1988 | Danielsson, III . |
| 4,811,250 | 3/1989 | Steber et al. .................... 33/608 |
| 4,934,063 | 6/1990 | Speisser ..................... 33/288 X |
| 4,997,283 | 3/1991 | Danielson et al. . |

FOREIGN PATENT DOCUMENTS

| | | |
|---|---|---|
| 2145992 | 3/1973 | Fed. Rep. of Germany . |
| 3640287 | 6/1988 | Fed. Rep. of Germany ........ 33/503 |
| 0148002 | 11/1981 | Japan ........................ 33/608 |
| 0000507 | 1/1982 | Japan ........................ 33/608 |
| 87007 | 5/1987 | PCT Int'l Appl. . |

Primary Examiner—Thomas B. Will
Attorney, Agent, or Firm—Head & Johnson

[57] ABSTRACT

The coordinates of a plurality of datum check points for a vehicle chassis is obtained relative to X, Y and Z coordinates relative to a given horizontal datum plane and/or a vertical datum plane and used primarily to prepare specification drawings for vehicle chassis to be used by body and frame alignment operators to correct collision damage.

9 Claims, 9 Drawing Sheets

APPARATUS TO GATHER, DISPLAY, AND/OR PRINT VEHICLE CHASSIS MEASUREMENT DATA FOR ACCURATE REPAIR OF COLLISION DAMAGED VEHICLES

RELATED APPLICATIONS

This is a continuation of copending application Ser. No. 07/778,391 filed on Oct. 16, 1991 now abandoned.

BACKGROUND

The invention herein is directed to a measuring and gauging system for use in conjunction with a vehicle body and frame straightening apparatus. Specifically, the invention is directed to straightening and reforming vehicle bodies, frames, and other parts of damaged or misaligned vehicles back to their dimensions and specifications that have been precisely laid down by the vehicle manufacturer. These dimensions and specifications are provided by the manufacturer and others in the form of charts for each and every vehicle which indicate certain reference surfaces and locations for measurement purposes. When these measurements are in correct configuration, then the chassis is straight.

In recent years automotive vehicles have been constructed almost entirely of what has been called a "unitized" body. In such a construction the entire frame and body of the vehicle are a unit assembly. Such a construction has been found to be more economical, lighter weight, and can equal or exceed the strength of a conventional frame-type automobile used heretofore. The repair of a unitized vehicle body necessitates the use of frame straightening machines which are designed to pull the damaged vehicle frame into proper alignment. The manufacturer provides "fixturing holes" and other identifiable locus in the frame of the vehicles as alignment data, which can be utilized for remeasurement and realignment when damage occurs.

For these purposes, a variety of methods and devices have been proposed to indicate or measure possible faulty or misaligned dimensions on the vehicle. To correct such misaligned vehicles such methods and apparatus as those disclosed in the Finis L. Chisum U.S. Pat. No. 3,360,066, issued Dec. 28, 1971 and U.S. Pat. No. Re. 31,636, reissued Jul. 1, 1984 from a patent issued Jun. 10, 1975 are used.

In order to straighten the frames and align the bodies of collision damaged automotive vehicles, it is imperative that the person or persons doing the collision damage repairs to frames and bodies have accurate, up to date alignment data of the particular vehicle being repaired.

The measurement/alignment data furnished by the automotive manufacturers to the collision repair industry for this purpose is far to complex for the average repair technician to use during the repair of the vehicle. There is far to much data for him to decipher which makes it nearly impossible to use this data in a typical collision repair operation.

At present, the best measurement information available used during a typical collision damage repair is provided by a variety of publishers and is usually taken from a vehicle of the same make and model by means other than electronically and is compared with the damaged vehicle in numerous ways.

In many cases after a new car model is introduced and sold to the public, body and frame alignment data in any form is not available for months after the new model hits the streets.

In the past, body and frame alignment technicians have had to make do with whatever information they could get at a given time to complete the repair. This type of a measuring data gathering system is just not adequate in today's market.

Heretofore, there has been no suitable means to obtain electronic measurement data from new automotive vehicles. Neither has there been a suitable means to use that data with the aid of a computer. There is no suitable means to take data obtained by electronic means and print this data into a hard copy book and have the same electronic measurement data recorded on electronic media suitable to provide other computers with this electronic measurement data for use while a collision damaged vehicle is being repaired.

SUMMARY

The object of this invention is to provide a means whereby new automotive vehicles can be electronically measured in strategic areas to give the repair technician quick and reliable information needed to realign a vehicle of the same make and model to its pre-accident condition.

This invention will also provide a means to reproduce the electronic measurement/alignment data and information into a computer software program suitable to load into other computers for comparison by the technicians in the process of straightening frames and aligning bodies on collision damaged vehicles.

In addition it would provide a means to gather and reproduce the electronic measurement information visually on a CRT, on hard copy, paper, etc. suitable for printing into book form to be distributed and used by collision repair technicians everywhere its needed. A further use of this machine is to measure collision damaged vehicles at insurance company drive in claims centers, collision repair facilities, automotive dealerships etc. and compare the measurement data obtained from the damaged vehicle to the information previously obtained from measurement of undamaged vehicles which are then entered into the computer to determine the extent of damage and to print out the damage on paper allowing the operator to produce better written damage reports on a given collision damaged vehicle.

Specifically the invention has for its object to provide apparatus and methods in combination with an analog or digital computer for providing the specification and X, Y, and Z coordinates of a plurality of datum check points on a vehicle chassis relative to a given horizontal and vertical plane. The apparatus for accomplishing the methods of the invention include a base frame and a lift frame connected therewith. Means are provided on the lift frame to receive the vehicle. The lift frame has parallel side rails which form the X-axis used in the measurement. Means are provided in combination with the base frame to raise the lift frame to a working height above the base frame. At least one coordinate measuring device is provided for movement along the side rails. The coordinate measuring device comprises a vertical support member which forms the Y-axis while a horizontal arm that is moveable vertically along the vertical support and also moveable horizontally transverse to the vertical support forms the Z-axis. A pointer at one end of the horizontal arm is positioned at a given one of the check points to thereby establish the X, Y, and Z coordinates of said check point. Means are then provided to sense and record and/or transmit the coordinate information to said computer for displaying and/or printing the aforesaid X, Y, and Z coordinates, and/or other measurement/alignment data.

DETAILED DESCRIPTION OF THE PREFERRED EMBODIMENT

While the invention has been described with a certain degree of particularity, it is manifest that many changes may be made in the details of construction and the arrangement of components without departing from the spirit and scope of this disclosure. It is understood that the invention is not limited to the embodiment set forth herein for the purposes of exemplification, but is to be limited only by the scope of the attached claim or claims, including the full range of equivalency to which each element thereof entitled.

Figure 1:
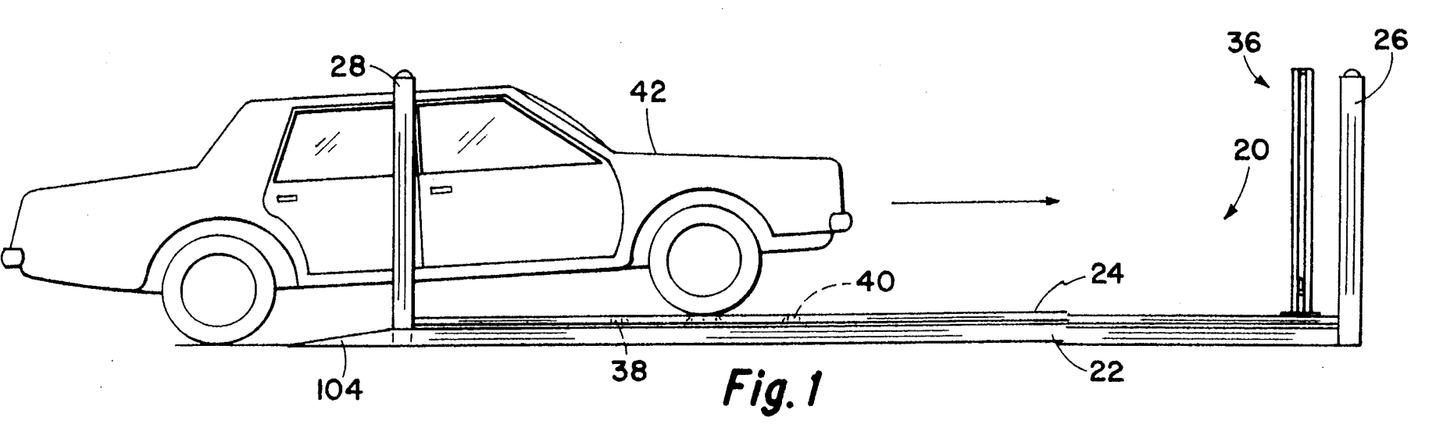
FIG. 1 depicts the apparatus of this invention as a vehicle enters the apparatus.
Figure 2:
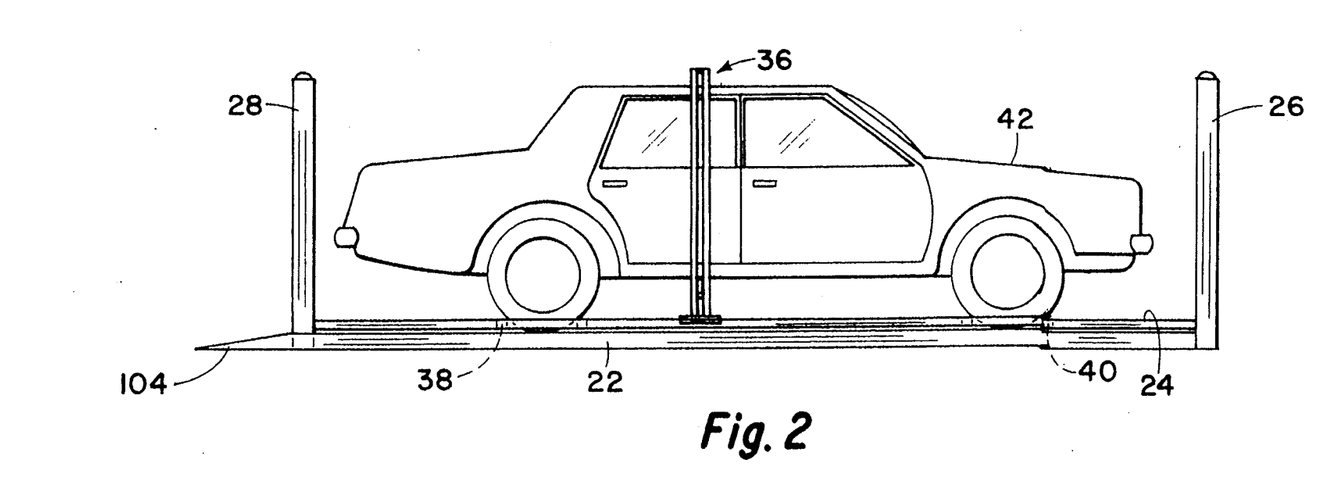
FIG. 2 depicts the apparatus of this invention with the vehicle loaded thereon.

Referring now to FIG. 1 the apparatus of this invention as generally shown and designated by the numeral 20 is comprised of a lower base frame 22 which rests or is bolted to the floor and an upper lift frame 24. Corner supports 26, 28, 30 and 32 provide stability to the apparatus and incorporate a mechanical means for raising the lift platform frame 24. The lift frame includes a coordinate measuring assembly generally designated by the numeral 36 which will hereinafter be more fully described in FIGS. 7-10. The lift frame assembly also includes, shown as dotted herein, a stationary vehicle cross member/wheel well 38 and a moveable wheel well or recess cross assembly 40 best shown in FIG. 5. In the view of FIG. 1 the vehicle 42 front wheels have just passed through the stationary cross member/wheel well 38 and are about to fall into the moveable cross member/wheel well 40. Once the front wheels of the vehicle 42 have entered the moveable cross member the vehicle is continued forward until the rear wheels enter the stationary cross member/wheel well 38 and the moveable cross member 40 reaches the position as shown in FIG. 2. Of course in the case of a front wheel drive vehicle the vehicle is backed into the frame.

Figure 3:
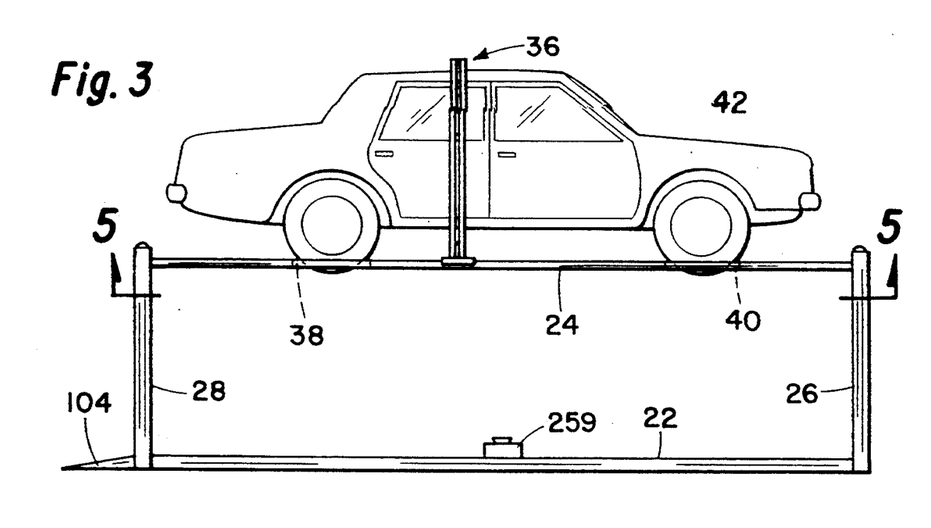
FIG. 3 depicts the apparatus of this invention with the loaded vehicle thereon in the lift or up position.
Figures 4, 11:
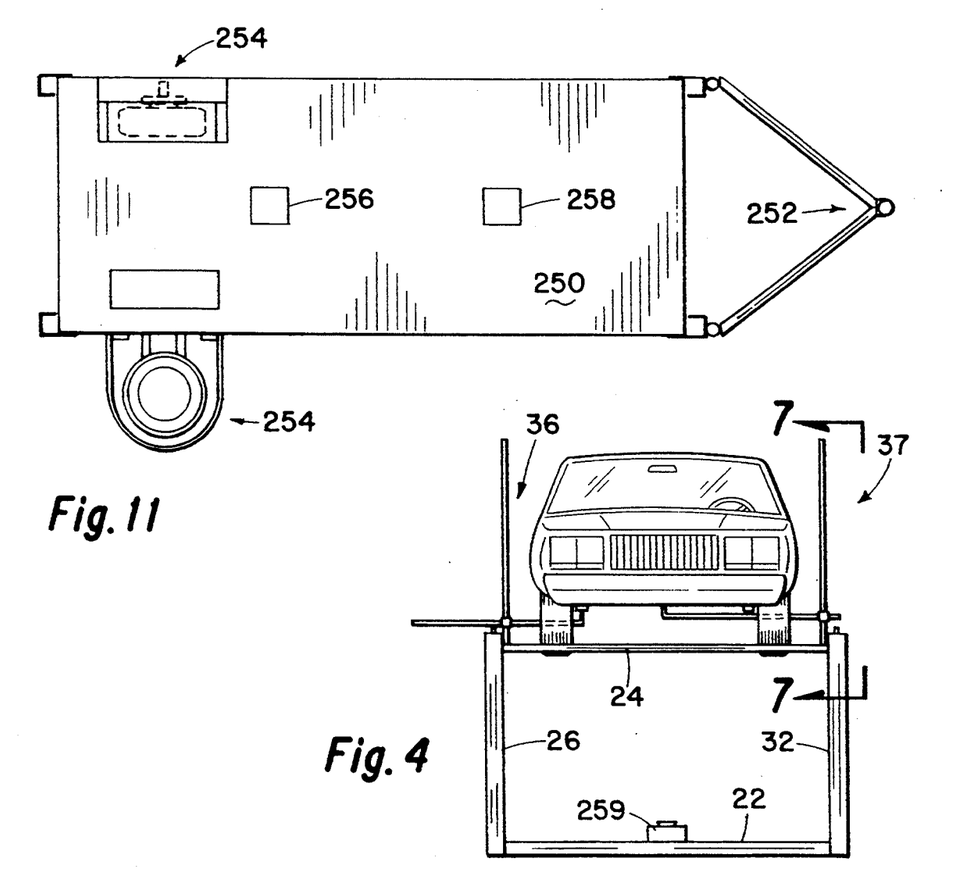
FIG. 4 is a front end elevational view of the apparatus and vehicle in the up position.
FIG. 11 is a top elevational view of a modified form of trailerable base assembly.
Figure 6:
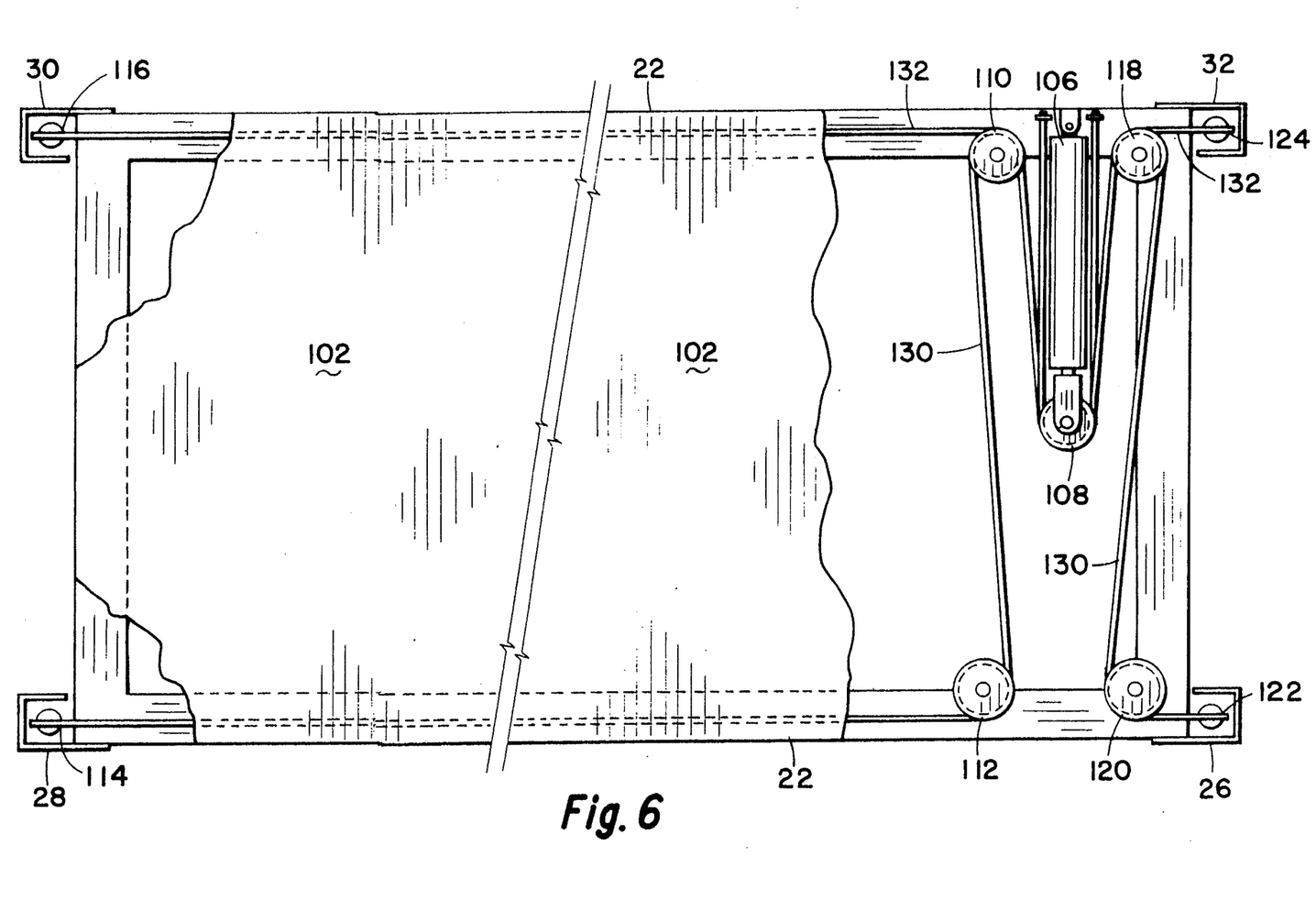
FIG. 6 is a top view, partly cut away showing the lower or base frame assembly and vertical lift mechanism.
Figure 7:
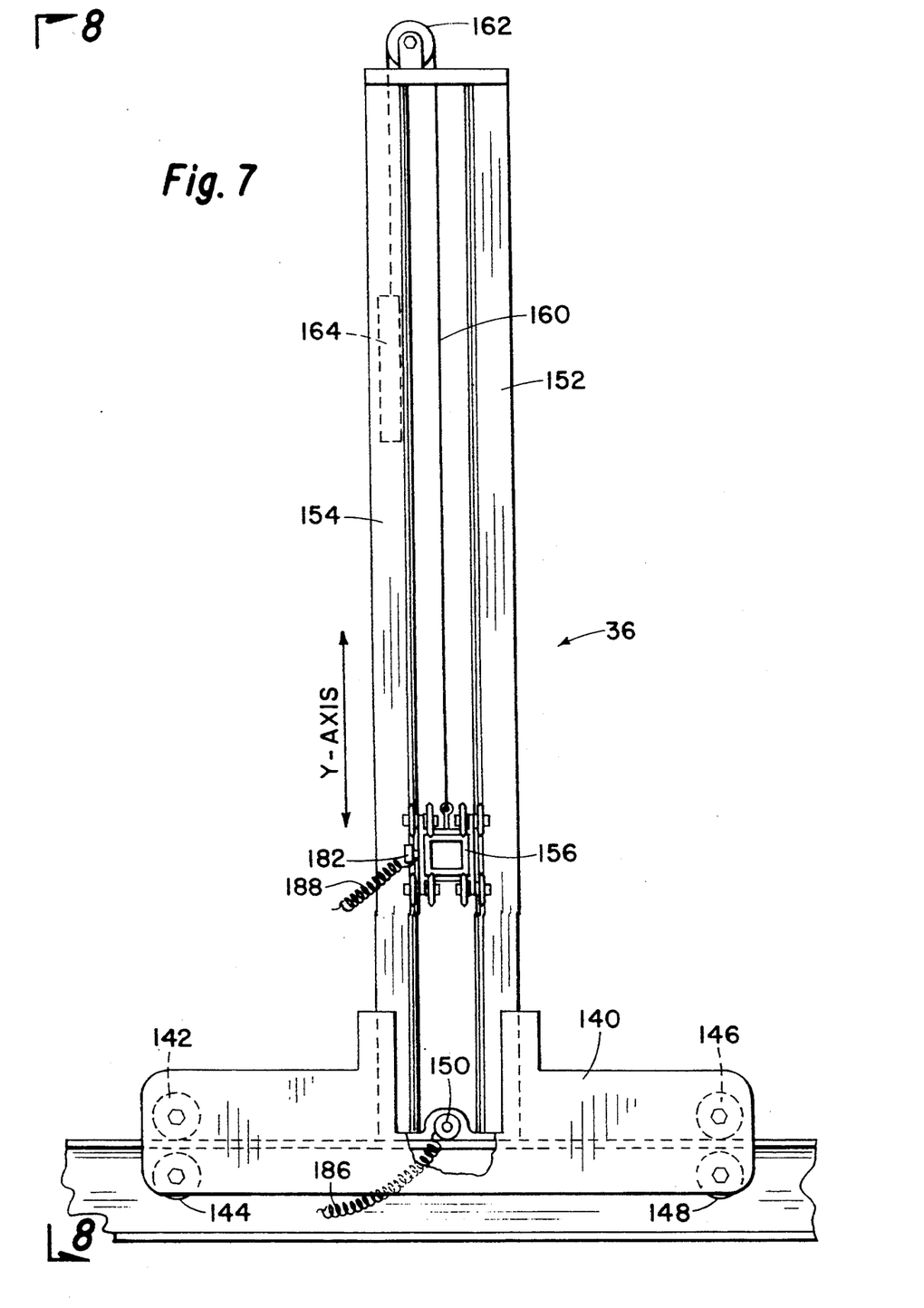
FIG. 7 is a side elevational view of the X, Y, and Z-axis measuring system.
Figure 8:
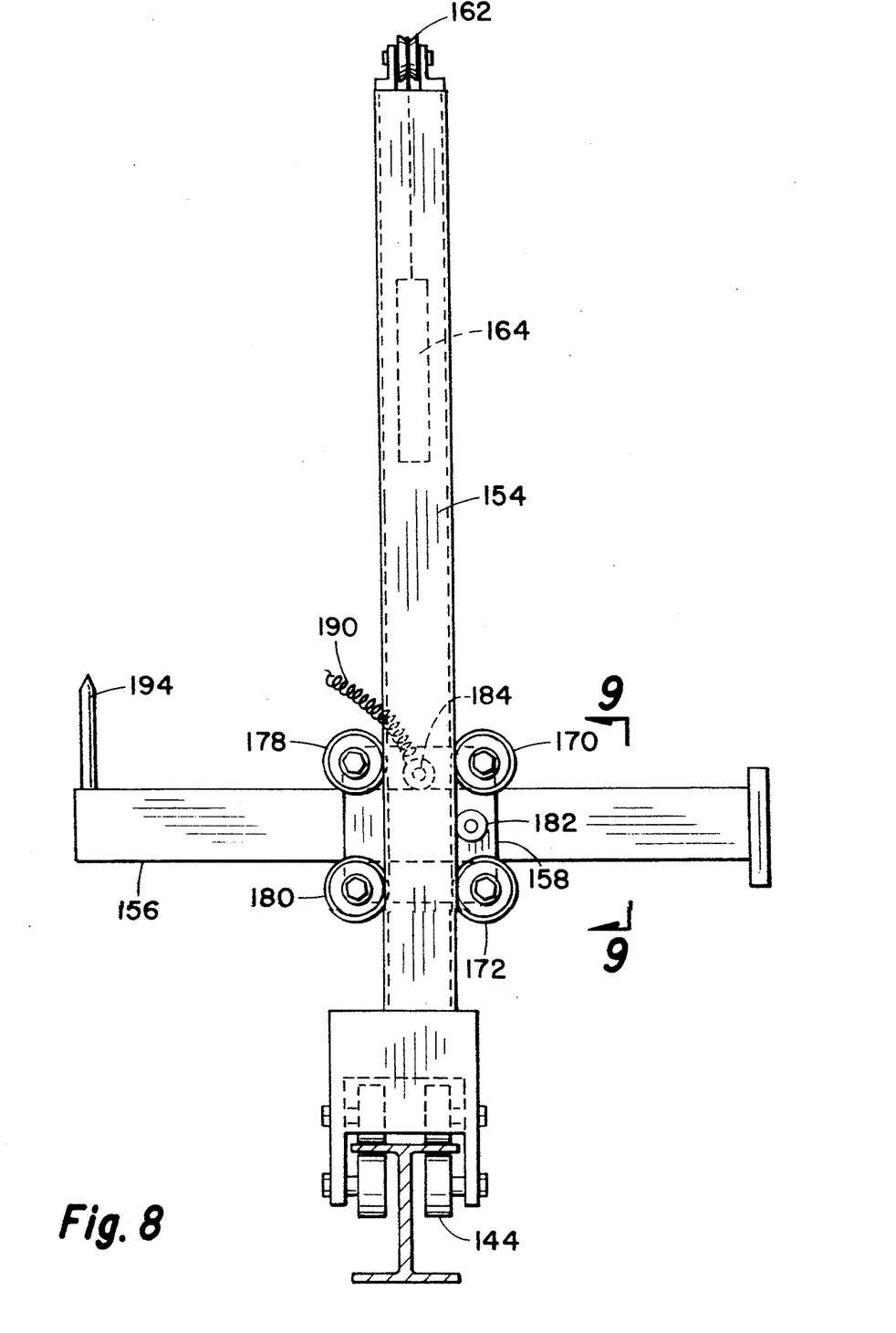
FIG. 8 is a front elevational view of the measuring system taken along the line 8—8 of FIG. 7.
Figure 9:
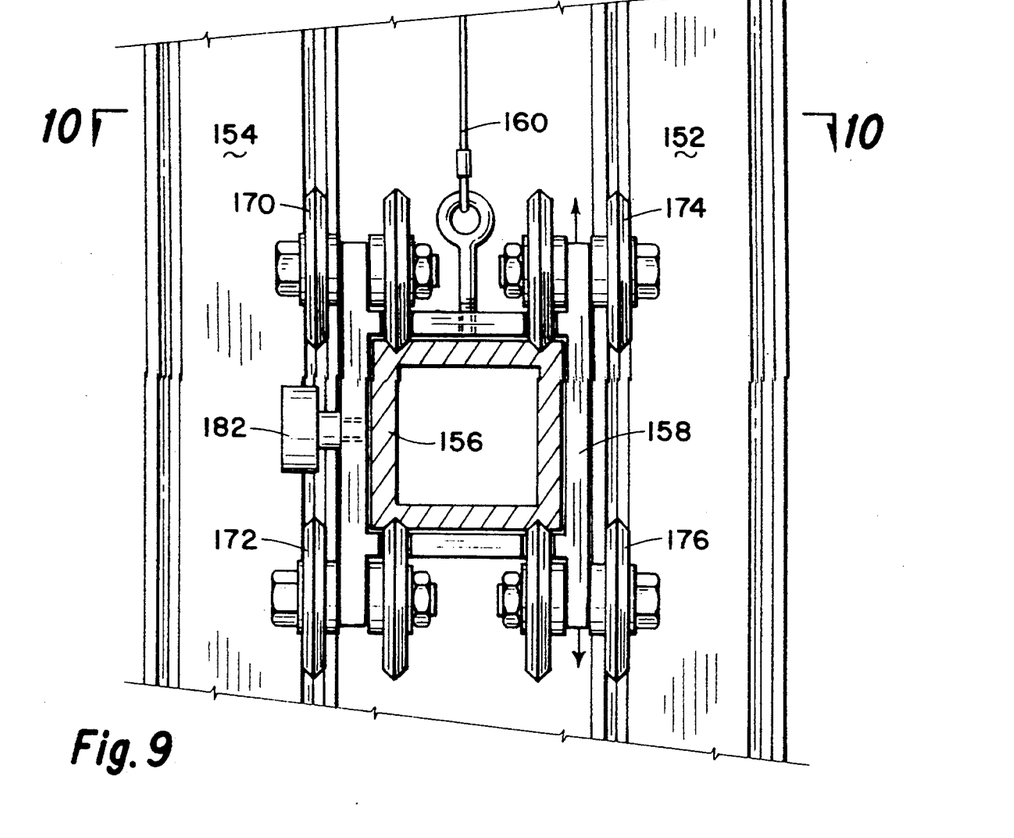
FIG. 9 is a sectional view taken along the line 9—9 of FIG. 8.
Figure 10:
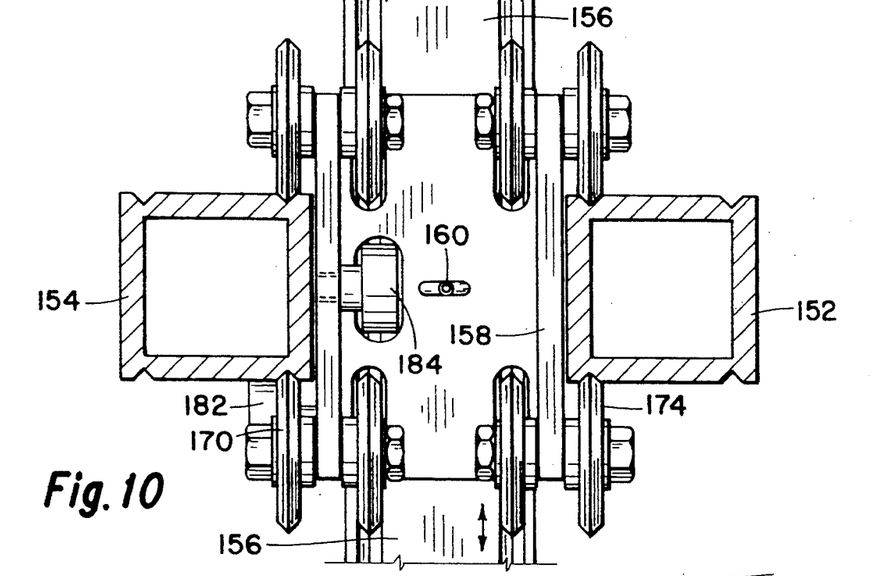
FIG. 10 is a sectional view taken along the line 10—10 of FIG. 9.

As shown schematically in FIGS. 3 and 4 the lift assembly 24 is raised by mechanism such as the type shown in FIG. 6 to the "up" position as shown. The height of the lift is typically such that a person may be able to work beneath the vehicle to take the measurements as described herein.

Figure 5:
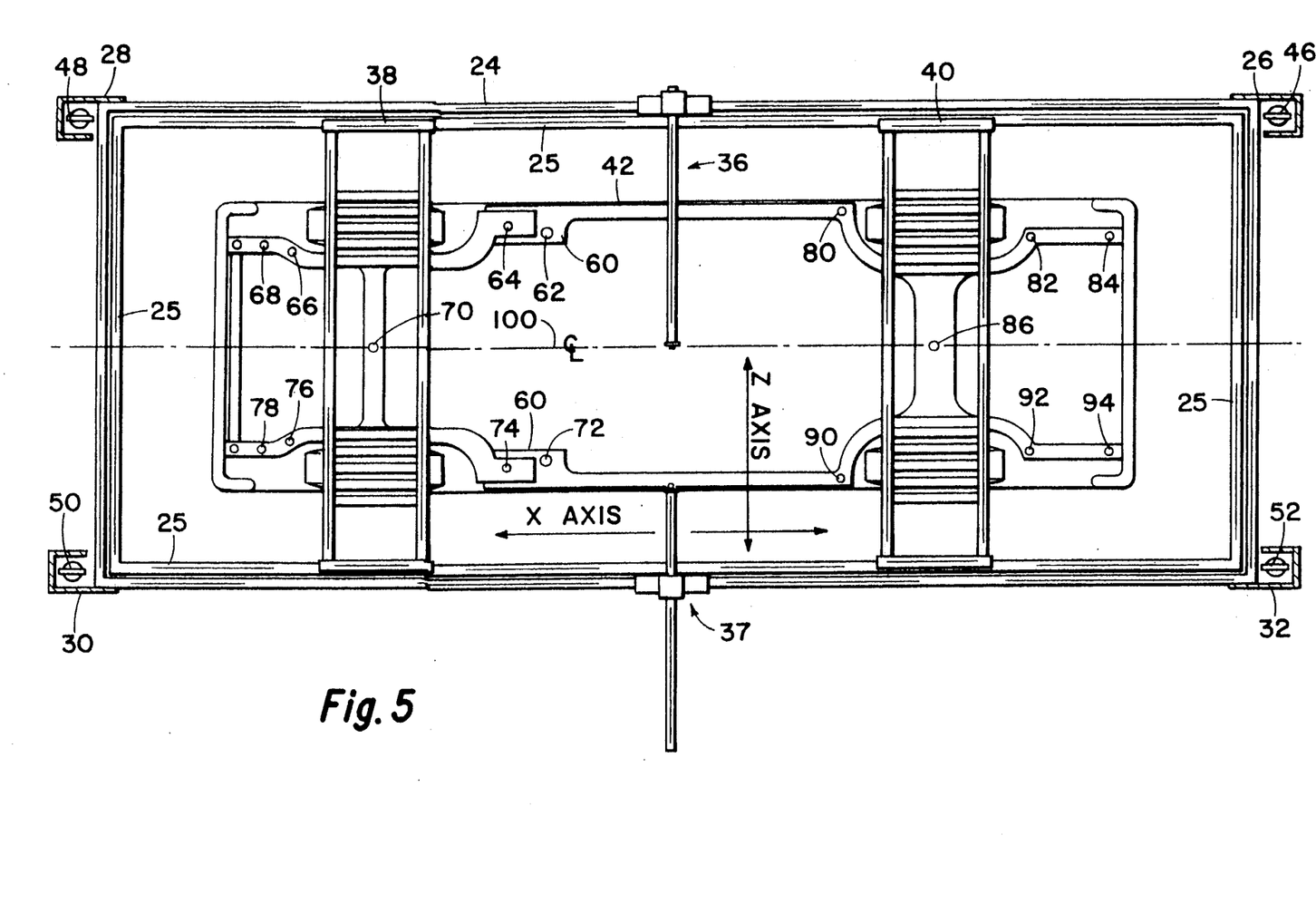
FIG. 5 is a bottom view of the apparatus of this invention taken along the line 5—5 of FIG. 3.

FIG. 5 represents a bottom view of the vehicle frame as it will be pictured on the lift frame 24 upon which the coordinate measuring apparatus 36 will traverse and which becomes the X-axis coordinate. The lift frame also includes an inner frame 25 connected to frame 24 and to which the stationary cross member/wheel well 38 is affixed. The moveable cross member/wheel well assembly 40 is adapted for forward and rearward movement along the inner lift frame assembly 25. Each of the corner support posts 26, 28, 30, and 32 include respective lift pulleys 46, 48, 50, and 52 which along with the hoisting line as described in FIG. 6 is adapted to raise and lower the lift frame assembly. Suitable safety devices, not shown, are incorporated within the lift assembly to provide further vertical support.

As shown in FIG. 5 the vehicle 42 includes a basic chassis or frame 60 which includes, and by way of example only, a plurality of measuring points which may be a jig hole, a rivet, a bolt, a pinch weld or other identifiable marking found on all vehicle frames of a particular make and model. Such places in FIG. 5 are shown at numerals 62-94.

Thus by using the coordinate measuring probes 36 and 37 the X, Y, and Z coordinates of said locations may be accurately determined relative to a given horizontal datum plane that is parallel to the horizontal axis of the vehicle and a vertical datum plane through the center line of the vehicle shown and indicated by the numeral 100 in FIG. 5.

Referring now to FIG. 6 a typical base frame 22 and incorporated lift system is shown in the top plan view (partially cut-away), the lift cylinder in this case being horizontally installed. The base frame 22 includes a top covering 102 and a tapered entry ramp 104 best shown in FIGS. 1, 2, and 3. Horizontally positioned within the frame and beneath the top 102 is lift cylinder 106. Attached to the reciprocable piston thereof is a double sheave 108. A first hoist wire line 130 extends around sheave 108 in a rearward direction around double sheave 110, thence around sheave 112 to sheave 114 found in the bottom of support post 28. The wire line then extends upward and over sheave 48 found in the top of the support tower 28 and is thence connected to the lift frame 24. The other side of the hoist line 130 extends around double sheave 118 then to sheave 120 to the lower vertical support arm sheave 122, thence upward to sheave 46 therearound into connection with the lift frame assembly 24. Likewise a second hoist wire line 132 extends around sheave 108, thence around sheave 110 rearwardly to sheave 116, thence upwardly to sheave 50 found at the top of the support post thence connected to the lift assembly. The other end of wire line 132 traverses around sheave 118 to the lower support arm sheave 124, thence upward to the upper sheave 52 and thence into connection with the lift frame assembly. In operation, upon the outward movement of the hydraulic cylinder/piston assembly 106 the lift assembly is raised to the working position as shown in FIGS. 3 and 4. It is to be understood that the above mechanism is but one example of other means to raise the lift frame. For example, use separate hydraulic cylinders in each vertical corner support which are powered in unison.

Referring now to FIGS. 7, 8, 9, and 10 the coordinate measuring system 36 of this invention is described. The system comprises, in this embodiment, a horizontal support frame 140 to which is attached suitable front rollers 142 and 144 and rear rollers 146 and 148 which rollably secure the coordinate measuring system to the upper lift frame 24. An X-axis sensing roller means 150 is connected to the horizontal support frame 140 and in rolling contact with the top of lift frame 24. Vertical support frames 152 and 154 are connected to the horizontal support frame 140 and spaced apart to receive the Z-axis coordinate measuring arm 156 which is rollably supported within the vertical or Y-axis support 158 which is best shown in the cross-sectional views of FIGS. 8 and 9. The Y-axis support is connected via cable 160 to a sheave 162 at the top of the vertical tower 154 and thence downward within the tower 154 to a counter balancing weight 164, shown dotted. The Y-axis support 158 is rollably connected to the vertical supports 152 and 154 by rollers 170, 172, 174, and 176 on one side of the support arms 152 and 154 while an additional mirror image set of rollers are located on the other side of the vertical support towers 152 and 154, a portion of which is shown at 178 and 180 in FIG. 8. Also connected to the Y-axis support frame is a Y-axis sensor 182 which is adapted to be in rolling contact with the vertical support 152 or 154. Similarly a Z-axis sensor 184 is provided on the Y-axis support member in rolling contact with the Z-axis measuring arm 156. One type of sensor is a rolling potentiometer type 112P, P1613, or P1612 manufactured by Maurey Instrument Corp., 4555 West 60th Street, Chicago, Ill. 60629. Other types of non-hard wired devices are inclusive, e.g., laser mechanisms such as shown in U.S. Pat. No. 4,997,283. Other mechanical and digital devices and scales such as coordinate measuring machines manufactured by Mitutoyo Corporation and sold in the United States by MTI Corp. as Models CX652 and CX854 are inclusive of the invention. At the end of the Z-axis support arm 156 is a suitable pointer mechanism 194. The pointer 194 can come in a variety of forms and lengths for different check points on the vehicle, e.g., a hole, nut, bolt, etc. The pointer may be pivotally connected to the end of the Z-axis support arm and/or removable therefrom.

Referring now to FIG. 11 a modified form of the invention is shown as a trailerable or portable device when necessary to obtain the data from a vehicle warehouse, new car dealers lot, or manufacturers plant. A modified base frame 250 is connectable to a trailer tongue or hitch generally designated by the numeral 252. All of the parts and mechanism shown in the previous views as to the lift system and coordinate measuring arm are omitted from this view. In this embodiment means are provided for a folding or collapsible wheel assembly generally designated by the numeral 254 shown in the collapsed position in the lower part of the figure and in the trail position in the upper part of the figure. In the collapsed position the frame would be situated, i.e., rest or be securable to the floor. Locations 256 and 258 are provided for locating still photography means and/or video cameras or lasers or other electronic means 259 for photographing or viewing the bottom of the vehicle once it has been in the lift position such as shown in FIG. 5, the signal from which is carried by a transmission means such as wire 261. This concept is also applicable to the embodiment of FIGS. 1–10.

Figure 12:
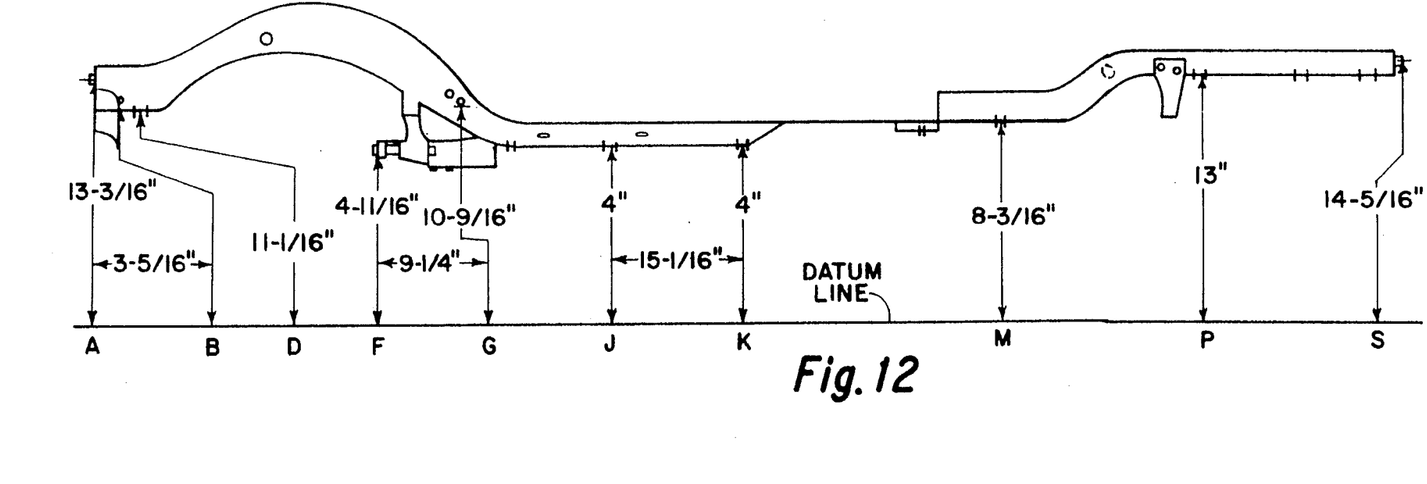
FIG. 12 is a side view of the correct dimension and specifications for a given vehicle frame as will be displayed and/or printed by the apparatus of this invention.
Figure 13:
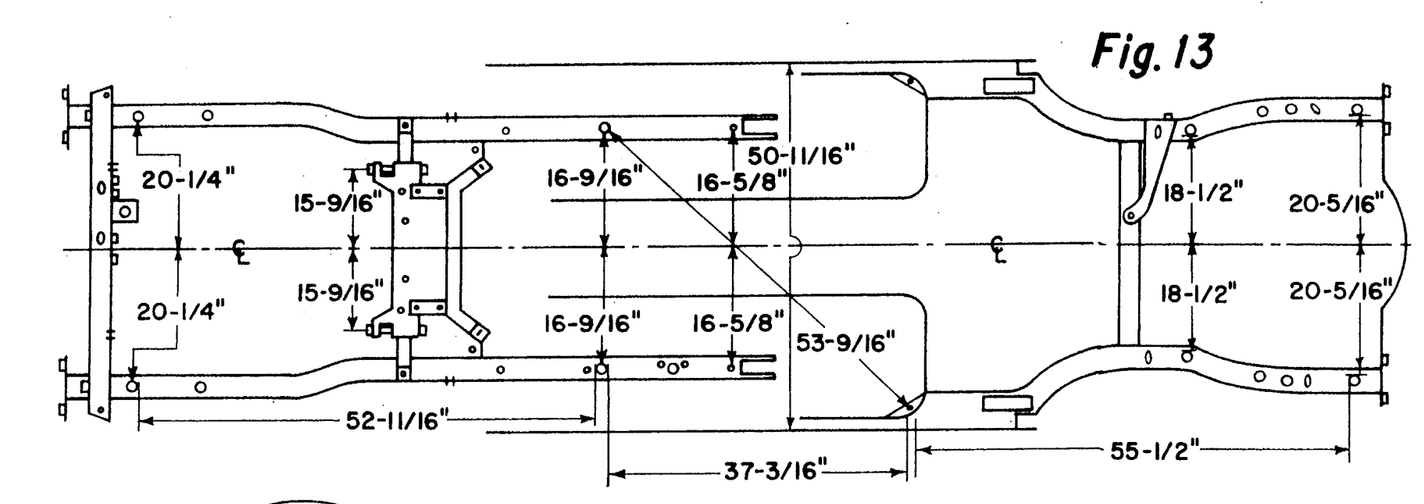
FIG. 13 is a bottom view of the frame of the vehicle shown in FIG. 12.

FIGS. 12 and 13 are examples of chassis dimension charts, in this particular case a 1988 Chrysler LeBaron GTS. The dimensions and the specifications shown thereon are provided by the manufacturer and/or others and assembled in booklets for use by body and frame alignment operators. The measurements are based on factory specifications and, in the case of unibody-type vehicles, were measured with the vehicle supported at the pinch welds found at the front and rear torque box areas of a vehicle. The various measuring points shown in FIG. 12 by the alphabetical letters, represent fixturing holes, bolts, nuts, studs, non-removable plugs, rivets, and the like. The datum line is an imaginary line or plane which is established at an arbitrary fixed distance below the vehicle. The datum line or plane is parallel and perpendicular to the vehicle's underbody and is established relative to the various measuring points, and becomes a fixed reference plane for all of the Y-axis dimensions. The X-axis dimensions are then found along the datum line relative to measuring points A–S.

FIG. 13 is a drawing of the vehicle's underbody; that is, the illustration is drawn as though viewing the vehicle from underneath looking up at the underbody, like FIG. 5. In both FIGS. 12 and 13 many of the dimensions have been omitted for clarity purposes and are provided herein only as a sample of the specification and dimensions by which the apparatus of this invention is capable of providing. Such information can be stored into the computer/comparator, hereinafter described that will allow the technician/mechanic, in the use of this invention, to determine the exact areas of a frame or body that need to be corrected, after repair, that such corrections meet the original manufacturers specification.

Figure 14:
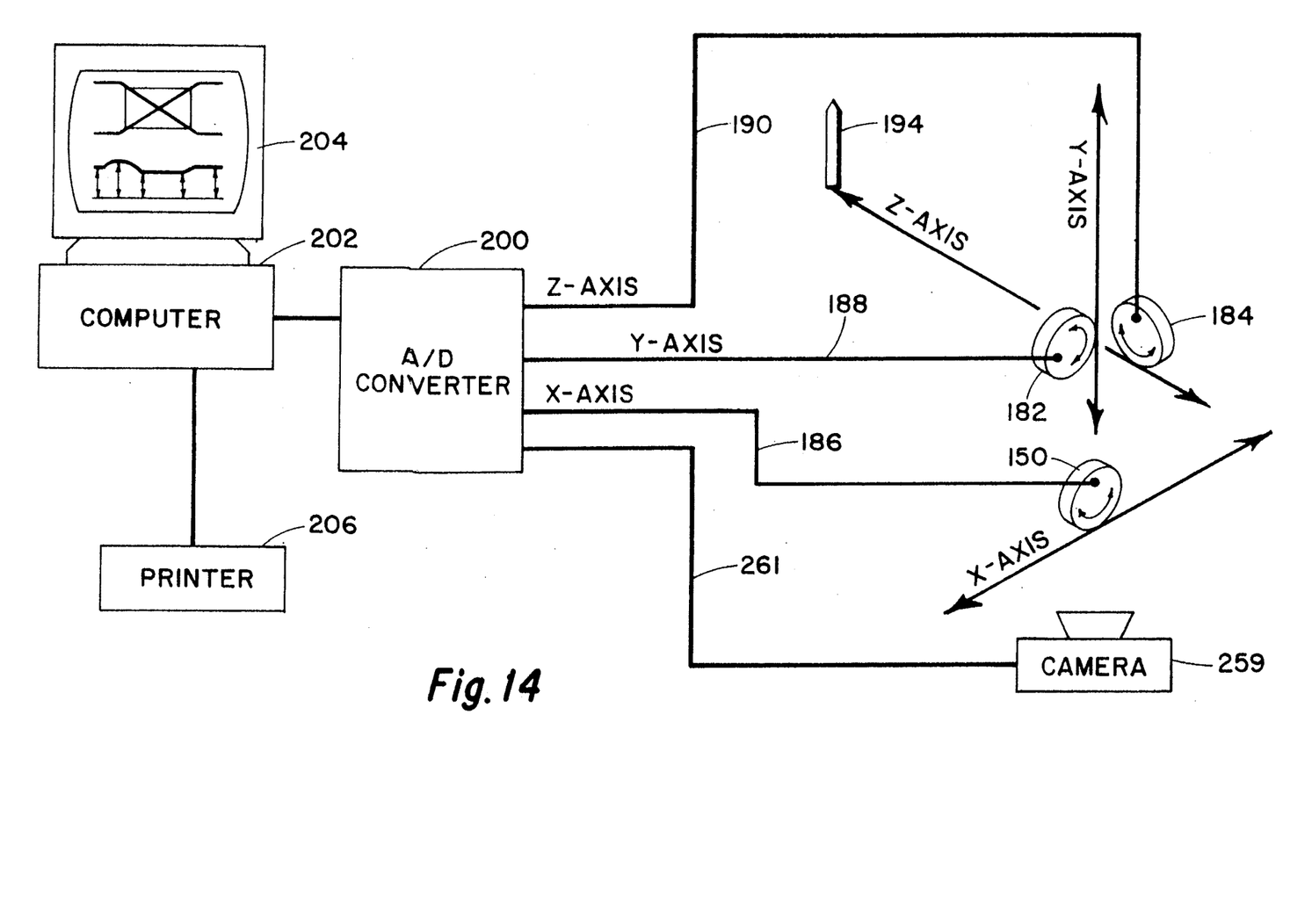
FIG. 14 is a schematic of the X, Y, and Z-axis information gathering system.

FIG. 14 is a schematic representation of the use of this invention in combination with in this instance a digital computer. Movement of the X, Y and Z-axis roller, 150, 182 and 184 respectively from a given plane is electronically transmitted by respective hard wires 186, 188 and 190 to an analog to digital converter 200. The information is gathered into a computer system 202 and displayed on a CRT 204 and/or printed from a printer 206. Hardware and software for computer data acquisition and control such as sold by Asyst Software Technologies, Inc., a subsidiary of Keithley Instruments, Inc. of Rochester, N.Y. 14623, and sold under the trademarks ASYST, or EASYEST LX and the Keithley UCPIO series of hardware.

OPERATION

In the use of the invention a vehicle 42, typically a brand new model to be measured is driven upon the lower base frame and lift frame as shown in FIG. 1 until the front wheels have come to rest within the moveable crossbar 40. The vehicle is continued forwardly until the rear wheels drop within the stationary crossbar 38 wherein the vehicle will be in the fixed measuring position on the lift frame 24. The vehicle is then lifted to the position as shown in FIGS. 3 and 4 and safely supported thereto. Once supported a photograph of the frame, as for example a polaroid photograph or preferably a video picture, from a source 259, of the underneath of the vehicle chassis such as shown in FIG. 5, is pictured on the computer screen for use by the operator providing a display for use in taking the measurements.

The apparatus of this invention can be permanently mounted or trailerable as shown in the device of FIG. 11. If a suitable pit is available the tracks or rails 22 will be supported thereabove on each side of the vehicle.

The operator inputs into the system and computer all of the pertinent information and software pertaining to the make, model, and serial number of each car to be measured.

Typically two additional technicians will operate the coordinate measuring arms 36 and 37 which will be moved along the track 25 to the front or the back of the vehicle. Once the center line 100 of the vehicle is established as, for example, by moving the probe arm 156 to a center line measuring point 70 and 86, the center line of the vehicle is established no matter where it may rest upon the vehicle lift frame. In the event no such center line information is available from the vehicle the operator may establish the center line by positioning pointer 36 at, for example, measuring point 62 while the operator using coordinate measuring system 37 will position the pointer at measuring point 72. From this information the computer will automatically determine the center line of the vehicle and thus all measurements of the Z-axis will be provided from the movement of the arm 156 to the various measuring points from the center line. That is, the distance between the two measuring points 62 and 72 are divided by two to define the center line. Similar information can be obtained at the rear of the vehicle as, for example, using measuring points 82 and 92. Thus, additional measurements made by the pointer as, for example, at 64 and 74, 66 and 76, etc. will provide distance to the operator at the display which are then permanently recorded. Once a zero point is established along the X-axis distances between several of the measuring points can be established as, for example, the distance between measuring point 74 and 72 and/or 72 and 90, etc. Additionally, the Y-axis determination may be provided by using the base frame, for example, as a zero datum line or other imaginary plane which is initially established at a given distance, i.e., usually from the lowest position of the frame which, for example, referring to FIG. 12 is a J and K. Once the datum line has been established by the computer then all of the vertical measurements from there on from front to rear as established by the necessary movement of the vertical support assembly 158 upward or downward as the case may be.

With all three X, Y, and Z-axis reference points established in the computer memory bank the computer can determine all necessary measurements from these established reference points by the operator simply touching the probe to points under or over the vehicle and informing the computer as necessary where the location of the particular measuring point which dimensional information is properly entered into the computer at the keyboard. When all necessary measuring points underneath the vehicle have been properly entered into the computer memory all dimensions will appear on the computer CRT screen 204 in a manner similar to that shown in FIGS. 12 and 13.

An instant developing or electronic camera 259 is placed on the floor under the vehicle as shown in FIG. 11. The pictures are used to show the operator the physical shape of the under structure of the vehicle by comparing the measurement points showing on the computer screen. With the pictures the operator can place the cursor in the proper location to correspond with the measuring points on the screen when all lines are drawn on the screen by the operator referring to the pictures and using the mouse or cursor movement keys or digitizer until all lines are established to the satisfaction of the operator. The computer is keyed to receive into its memory all lines drawn by the use of the mouse or cursor movement keys or digitizer. When an electronic camera is used, they may or may not need to use the cursor.

Upper body measurements are now ready to be entered into the computer. The three axis measuring devices are moved along their lineal axis tracks near the upper body points to be measured. Move the probe arm to touch any necessary point on the operation of the vehicle again telling the computer by the use of the keyboard you are measuring upper body and at what station the vehicle probes are pointing. Key the computer at each desired location to enter into memory all desired upper dimensions. Again by use of the cursor or mouse and in reference to the upper measuring points showing on the computer screen at this point the operator moves the mouse, digitizer or cursor movement key to establish the lines necessary to show the likeness of the vehicle being measured as close as possible and keying these lines into the memory bank.

At this point operator makes sure he has entered all necessary data including written and graphics by reviewing the computer screen. When satisfied the operator keys the computer to save all data in reference to a particular vehicle. If the operator does not forget to enter into memory some pertinent information all necessary data will be available at fingertip reach for a technician in the field to use that data to realign to preaccident condition of any vehicle of the same make and model.

With the use of a color printer and/or plotter, a colored copy with all necessary measurement and written instructions etc. can be produced suitable for reproduction into a book form suitable for use in collision repair shops where a computer measurement system is not available. The output does not have to be in color.

What is claimed is:

1. Apparatus for specifying X, Y and Z coordinates of a plurality of datum check points on a vehicle chassis relative to a given horizontal and vertical plane comprising:
   a base frame;
   a lift frame;
   means on said lift frame to receive said vehicle, said lift frame having parallel rails along each side of said vehicle forming an X-axis;
   means to raise said lift frame to a working height above said base frame;
   at least one coordinate measuring assembly for each of said rails, each said assembly comprised of a vertical support member forming a Y-axis and moveable along said rail, a horizontal arm moveable vertically along said vertical support member (Y-axis), and moveable horizontally transverse to said vertical support member along a Z-axis, and a pointer at one end of said horizontal arm for positioning at a given one of said check points to establish the X, Y, and Z coordinate of a given one of said check points; and
   means associated with said vertical support member and with said horizontal arm to sense their locations relative to said horizontal and vertical planes and record said X, Y, and Z coordinates for each of said check points.

2. The apparatus of claim 1 wherein the means to sense said coordinates comprises a roller for measuring distance of said device, along each said X, Y and Z axis at a plurality of said datum check points relative to said horizontal and vertical planes.

3. The apparatus of claim 2, wherein each of said rollers provide electrical analog information which is transformed into digital information and transmitted to a digital computer having programmed means to display said information.

4. The apparatus of claim 3 wherein said means to display said information is a cathode ray tube screen.

5. The apparatus of claim 3 wherein said means to display said information is in printed form.

6. The apparatus of claim 1 wherein said vehicle is positioned over a below ground pit.

7. Apparatus of claim 1 wherein said means to record is in a computer memory which can be displayed upon a cathode ray tube screen.

8. Apparatus of claim 1 including means at or below said horizontal plane to take and transmit a photographic image of said vehicle chassis upon which to record said X, Y and Z coordinates for each said datum check point.

9. Apparatus of claim 8 including means to display said photographic image and said X, Y, and Z coordinates upon a cathode ray tube screen.

* * * * *